United States Patent
Drottar et al.

(10) Patent No.: US 6,687,840 B1
(45) Date of Patent: *Feb. 3, 2004

(54) MULTI-LINK EXTENSIONS AND BUNDLE SKEW MANAGEMENT

(75) Inventors: Ken Drottar, Portland, OR (US); David S. Dunning, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/557,099

(22) Filed: Apr. 21, 2000

(51) Int. Cl.$^7$ ............................................... G06F 13/42
(52) U.S. Cl. ...................................... 713/401; 713/400
(58) Field of Search ................................. 713/400, 401; 709/226; 710/60, 61

(56) References Cited

U.S. PATENT DOCUMENTS

| | | | |
|---|---|---|---|
| 5,420,857 A | 5/1995 | Jurkevic | |
| 5,592,610 A | 1/1997 | Chittor | |
| 5,654,958 A | 8/1997 | Natarajan | |
| 6,094,683 A | 7/2000 | Drottar et al. | |
| 6,181,704 B1 | 1/2001 | Drottar et al. | |
| 6,339,788 B1 | 1/2002 | Geyer et al. | |
| 6,370,579 B1 * | 4/2002 | Partridge | 709/226 |
| 6,389,016 B1 * | 5/2002 | Sabaa et al. | 370/389 |
| 6,393,483 B1 | 5/2002 | Laif et al. | |
| 6,421,793 B1 * | 7/2002 | Lester et al. | 714/37 |

FOREIGN PATENT DOCUMENTS

JP 11177538 A * 7/1999 ............. H04L/1/16

OTHER PUBLICATIONS

"Method of Maintaining Continuity of Messages Over Publish/Subscribe System Failures", IBM Research Disclosure, Oct. 1, 1998, UK.*

"Next Generation I/O for Today's Servers," Intel Corp., 1998, 22 pages, downloaded from intel.com.

Schwartz & Price, "News from the NGIO Forum," NGIO Forum, Inc., Jul. 20, 1999, 3 pages.

Aberdeen Group, "Next Generation I/O: A New Approach to Server I/O Architectures," Feb. 1999, pp. 1–14 downloaded from ngioforum.org.

"The Next Generation of I/O Servers," Intel Corp., 1999, 2 pages, downloaded from intel.com.

"Intel Introduces Next–Generation Input/Output for Computing Servers," Intel Corp., 1999, 2 pages, downloaded from intel.com.

"NGIO Set to Offer Next–Generation I/O for the Internet," Intel Corp., 1999, 4 pages, downloaded from intel.com.

"Welcome to the next generation in I/O Technology," NGIO Forum, Inc., 4 pages, dowloaded from ngioforum.org.

"NGIO Forum Announces 1.0 Specification," NGIO Forum, Inc., Jul. 20, 1999, 26 pages.

I/O the next generation, "Link Specification," Intel Corp., 1998, 65 pages.

I/O the next generation, "Agenda," Intel Corp., 1998, 19 pages.

* cited by examiner

Primary Examiner—Thomas Lee
Assistant Examiner—Paul Yanchus, III
(74) Attorney, Agent, or Firm—Blakely, Sokoloff, Taylor & Zafman LLP (57) ABSTRACT

A method, apparatus, and system are provided for multi-link extensions and bundle skew management. According to one embodiment, multiple parallel links between two or more devices are combined into a single channel, and cells on the various links are received in a round-robin order, and variations in flight time between the various links are compensated through a timer at each receive port of the bundle.

26 Claims, 9 Drawing Sheets

MULTI-LINK EXTENSIONS AND BUNDLE SKEW MANAGEMENT

FIELD OF THE INVENTION

This invention relates to network server input/output (I/O) architecture and in particular to, aggregating bandwidth between a network server's central processing unit (CPU) and its I/O system by bundling multiple physical links.

BACKGROUND OF THE INVENTION

The Next Generation I/O (NGIO) architecture, as described in Next Generation I/O Link Architecture Specification: Link Specification published Mar. 26, 1999, is a channel-oriented, switched fabric, serial point-to-point link architecture aimed at meeting the growing needs of I/O reliability, scalability and performance on servers. NGIO introduces the use of an extremely efficient engine that is directly coupled to host memory which replaces shared buses with a fabric of switchable point-to-point links. This approach decouples the CPU and associated memory and cache from the I/O subsystem, as opposed to today's load/store memory-mapped I/O, and addresses the problems of reliability, scalability, modular packaging, performance and complexity. Processes running on the CPU communicate with peripherals asynchronously with the I/O channel engine being responsible for moving data to and from main memory and allowing the bus to act as a switch with point-to-point links capable of near linear scaling with CPU, memory and peripheral performance improvements. The use of standard, off-the-shelf components, such as the link physicals, also permit this architecture to scale as higher bit rate frequencies become available providing backward compatibility and investment protection.

NGIO link architecture provides a method called Multiple Link Expansion (MLX) that aggregates the bandwidth of multiple parallel links to increase bandwidth and reduce latency. MLX allows multiple links to be connected between two devices. These parallel links can be bundled through MLX to work in concert as a single high bandwidth link.

During transmission, MLX transmits cells across bundled links. A bundle is made up of an ordered set of links. The transmitter must initiate cells across links of a bundle in a specified, round-robin order. The receiver knows this order and expects the cells to be distributed in that order.

Figure 1:
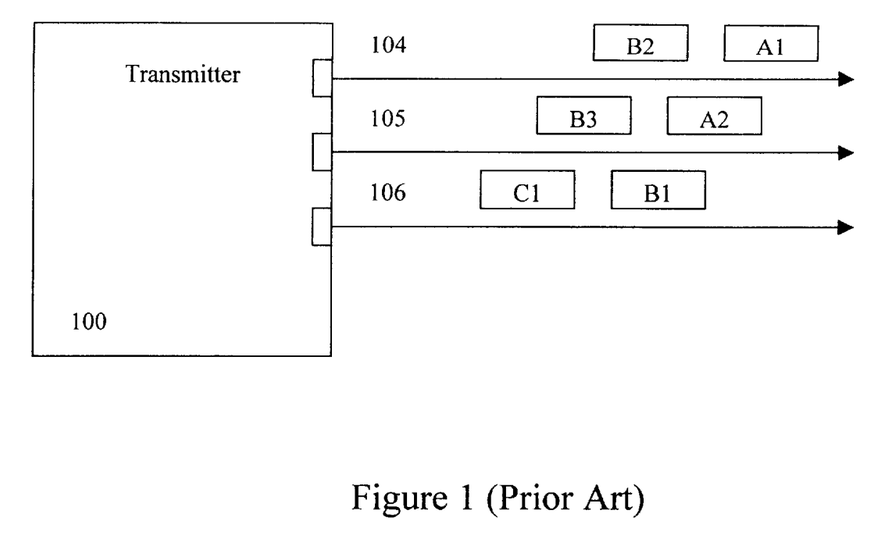
FIG. 1 is a block diagram of the prior art showing a normal staggered transmission in round-robin fashion over bundled links.

FIG. 1 is a block diagram of the prior art showing a normal transmission in round-robin fashion over bundled links. Here, transmitter 100 transmits three packets, A, B, and C. Each packet is segmented into appropriately sized cells. Packet A consisting of two cells (A1 and A2), packet B consisting of three cells (B1, B2, and B3), and packet C consisting of a single cell (C1) are then sent from transmitter, 100, across bundled links connected to ports 104, 105, and 106. The order of the bundled links has been specified by a fabric manager as 104, 105 and 106.

A cell is first dispatched from the port at the top of the round-robin order, here 104. The next port in the round-robin order, 105, if staged with a cell, A2, may start transmitting that cell after the previous port, 104, has started to dispatch the previous cell, A1.

Figure 2:
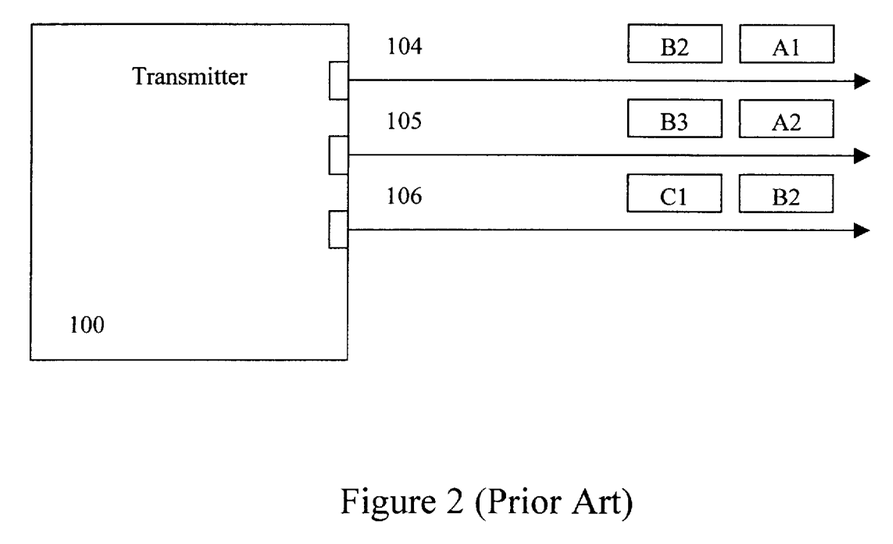
FIG. 2 is a block diagram of the prior art showing a normal simultaneous transmission over bundled links.

When the round-robin order reaches the last port in the order, 106, it wraps to the first port in the bundle, 104. To dispatch a cell, each port must wait until the previous port starts transmitting the previous cell. A port may start transmission at the same time as the previous port but must not transmit any earlier. FIG. 2 is a block diagram of the prior art showing such a simultaneous transmission. Transmission doesn't occur until the port satisfies the minimum inter-cell gap requirement.

All ports of the bundle must follow this MLX order behavior. If the next port in the round-robin order does not have a cell staged, the round-robin ordering does not advance.

Figure 3:
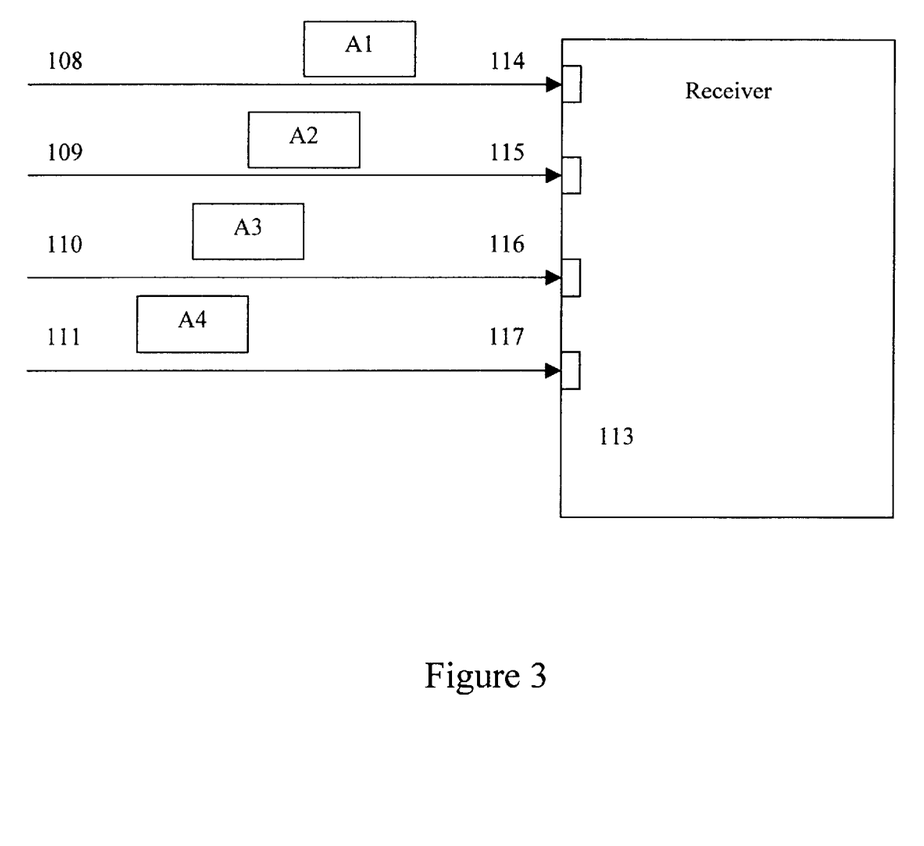
FIG. 3 is a block diagram of the prior art showing a typical reception in round-robin fashion over bundled links.

The receiver expects cells to arrive in a specified, round-robin order. FIG. 3 is a block diagram of the prior art showing a typical reception in round-robin fashion over bundled links. Here, packet A consisting of four cells, A1–A4, is sent to receiver 113 across a four-link bundle consisting of links 108, 109, 110 and 111. The reception sequence in the example is port 114,115,116, then 117. Port 114 is currently at the top of the receive round-robin order. All sequence numbers were correctly applied by the transmitter. Each cell follows MLX transmission order from the perspective of the transmitter.

Under MLX, cells must be received in the expected round-robin order. Links bundled together under MLX must use the same transmission rate. However, even links with the same transmission rate may have different flight times due to physical characteristics such as length. Therefore, cells may sometimes be received in violation of the ordering requirement.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

A method and apparatus are described for aggregating bandwidth of multiple parallel links between two devices to increase bandwidth and reduce latency. These parallel links can be bundled to work in concert as a single high bandwidth link. The various links of the bundle are handled in a round-robin order. Variations in flight time between the various links are compensated for through a timer at each receive port of the bundle.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

Importantly, while embodiments of the present invention will be described with reference to NGIO and bundled physical links between a network server's CPU and its I/O system, the method and apparatus described herein are equally applicable to other systems using multiple physical links between devices. For example, the techniques described herein may be used in intra and inter-board communications and/or intra and inter-module communications and data transfer between memory controllers, memory boards, caches, and I/O devices used for inter-process communication, network traffic, and/or mass storage.

Figure 4:
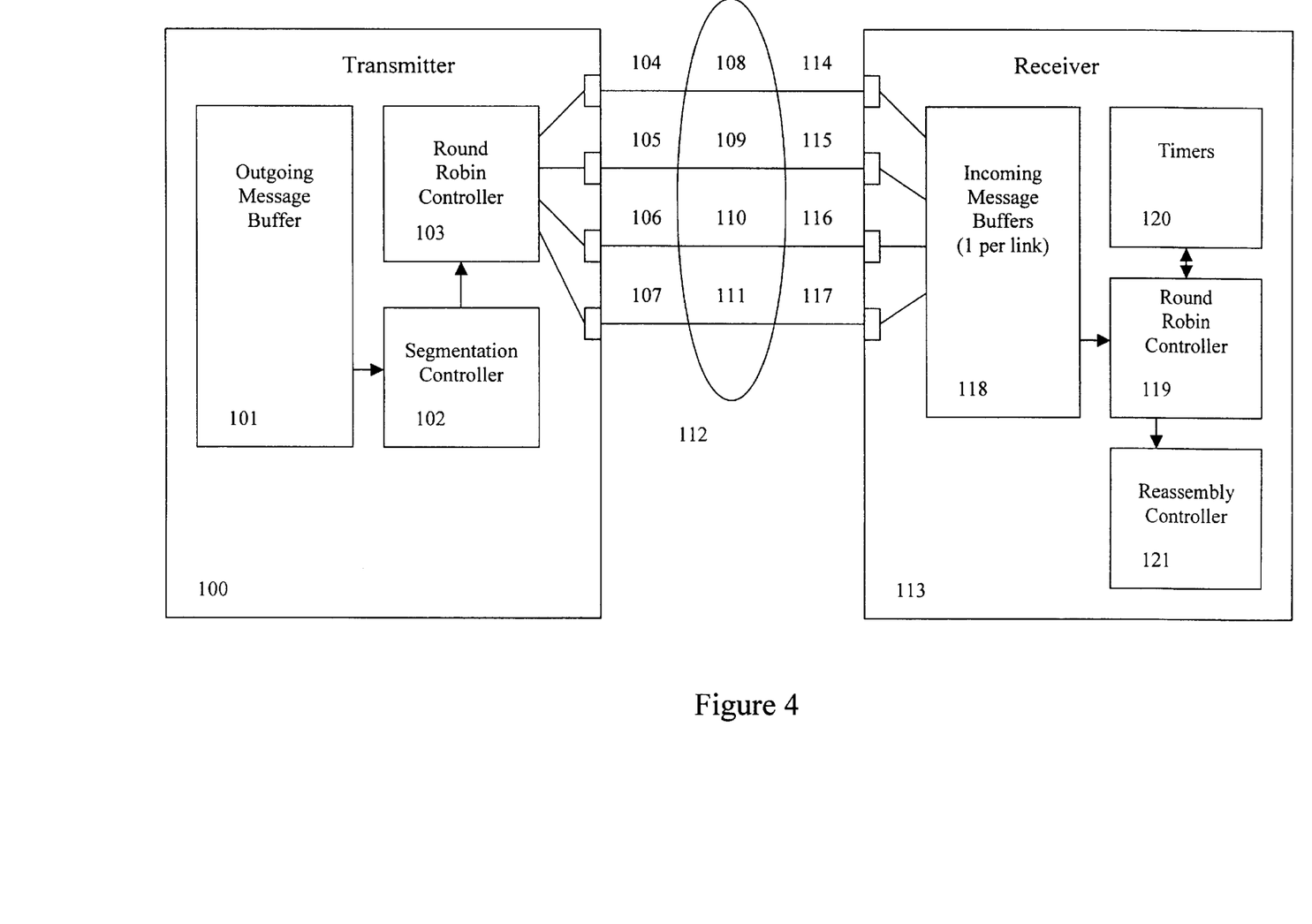
FIG. 4 is a block diagram of one embodiment of the present invention.

One embodiment of the present invention is illustrated in FIG. 4. Here, a transmitter 100 and a receiver 113 are shown for ease of explanation. However, it should be realized that transmissions between these two devices can be duplex and therefore each device can act as both a transmitter and receiver as necessary. The transmitter 100 can be a device such as a host channel adapter (HCA) and the receiver 113 can be a device such as a target channel adapter (TCA).

The transmitter 100 and the receiver 113 can be connected by several physical links 108–111. These links are connected to the transmitter at ports 104–107 and to the receiver at ports 114–117. Links 108–111 are bundled together to form one logical channel 112. Packets to be transmitted across channel 112 are separated into appropriately sized cells by the segmentation controller 102. These cells are then transmitted from ports 104–107 in an appropriate round-robin order determined by the round-robin controller 103.

Cells arriving at the receiver ports 114–117 are temporarily stored in the incoming message buffers 118. The cells are read from the ports in an appropriate round-robin order determined by the round-robin controller 119. These cells are then recombined into the original packets by the reassembly controller 121.

Links in a bundle may have different flight times. Therefore, cells which are transmitted following MLX ordering behavior may arrive at the receiver in apparent violation of this ordering behavior. In one embodiment of the current invention this skew is compensated for through a timer at each receive port of the bundle. The timer is loaded with time $T_{skew}$. MLX does not specify the timeout which can be long and conservative since it is not the primary mechanism for detecting lost cells or validating good cells. A longer timeout allows cables of significantly different flight time characteristics, such as different cable lengths, to be successfully bundled. A longer timeout requires deeper buffers and produces some additional latency in servicing good cells in other receive port buffers, but cells will not be lost or mistaken. Preferably, the $T_{skew}$ value represents the worst-case flight time of the smallest possible cell (e.g., 20 bytes) across the particular physical media.

Bundle Skew Management Processing

In one embodiment of the current invention when a cell arrives on an unexpected link of a bundle, the receiver continues waiting for a cell to arrive on the expected link for a time interval equal to Tskew. This is called the bundled link skew value.

Figure 5:
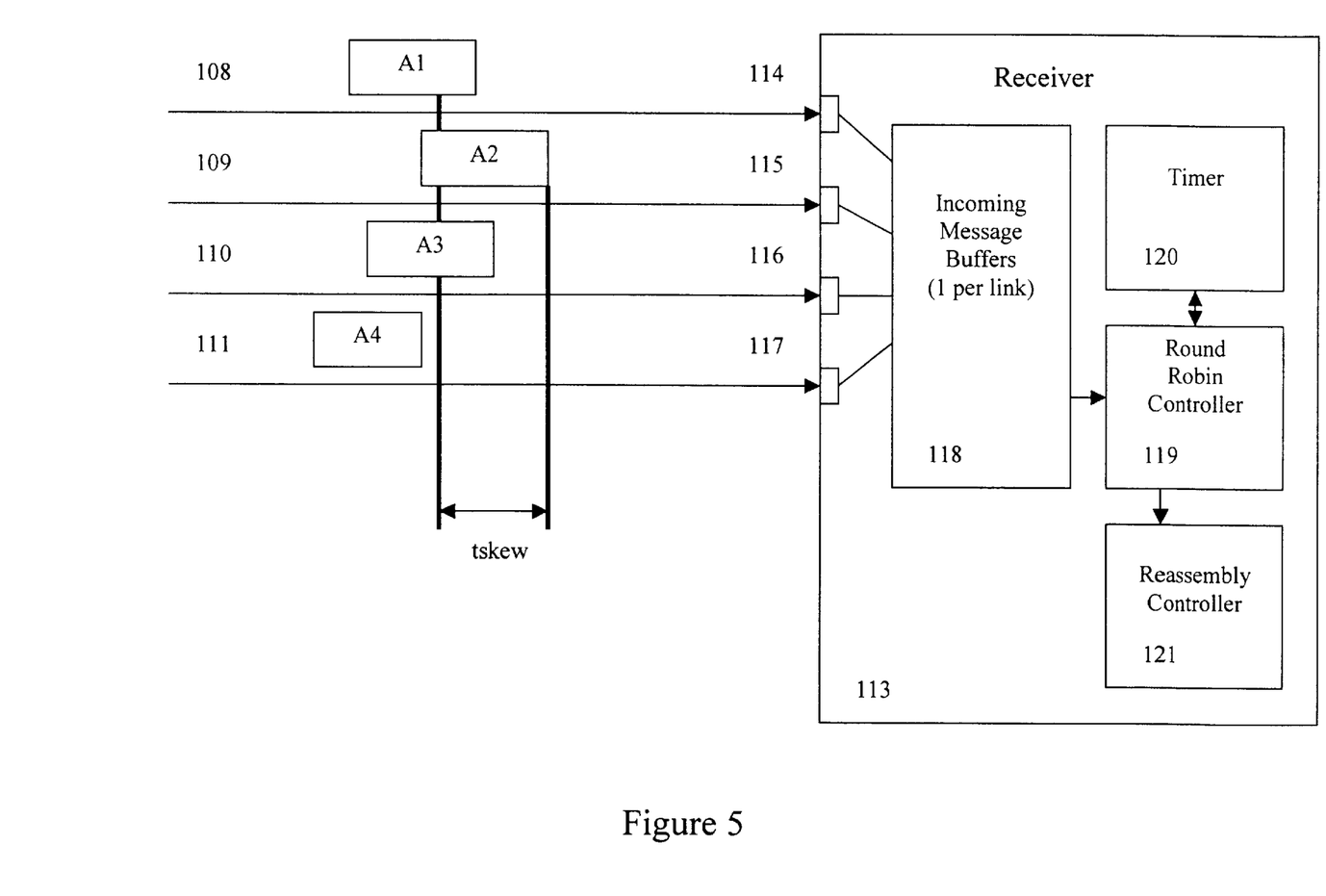
FIG. 5 is a block diagram of a reception in round-robin fashion over bundled links in which the reception has been skewed but remains valid according to one embodiment of the present invention.

In one embodiment of the current invention illustrated in FIG. 5, packet A is a packet consisting of four cells (A1–A4) which is sent across four bundled links 108–111. These links are connected to receiver ports 114–117. The round-robin order of the bundled links is receiver port 114, 115, 116 then 117. Port 114 is currently at the top of the round-robin order. The transmitter correctly assigns all sequence numbers. Each cell follows the MLX transmission order from the perspective of the transmitter.

Figure 6:
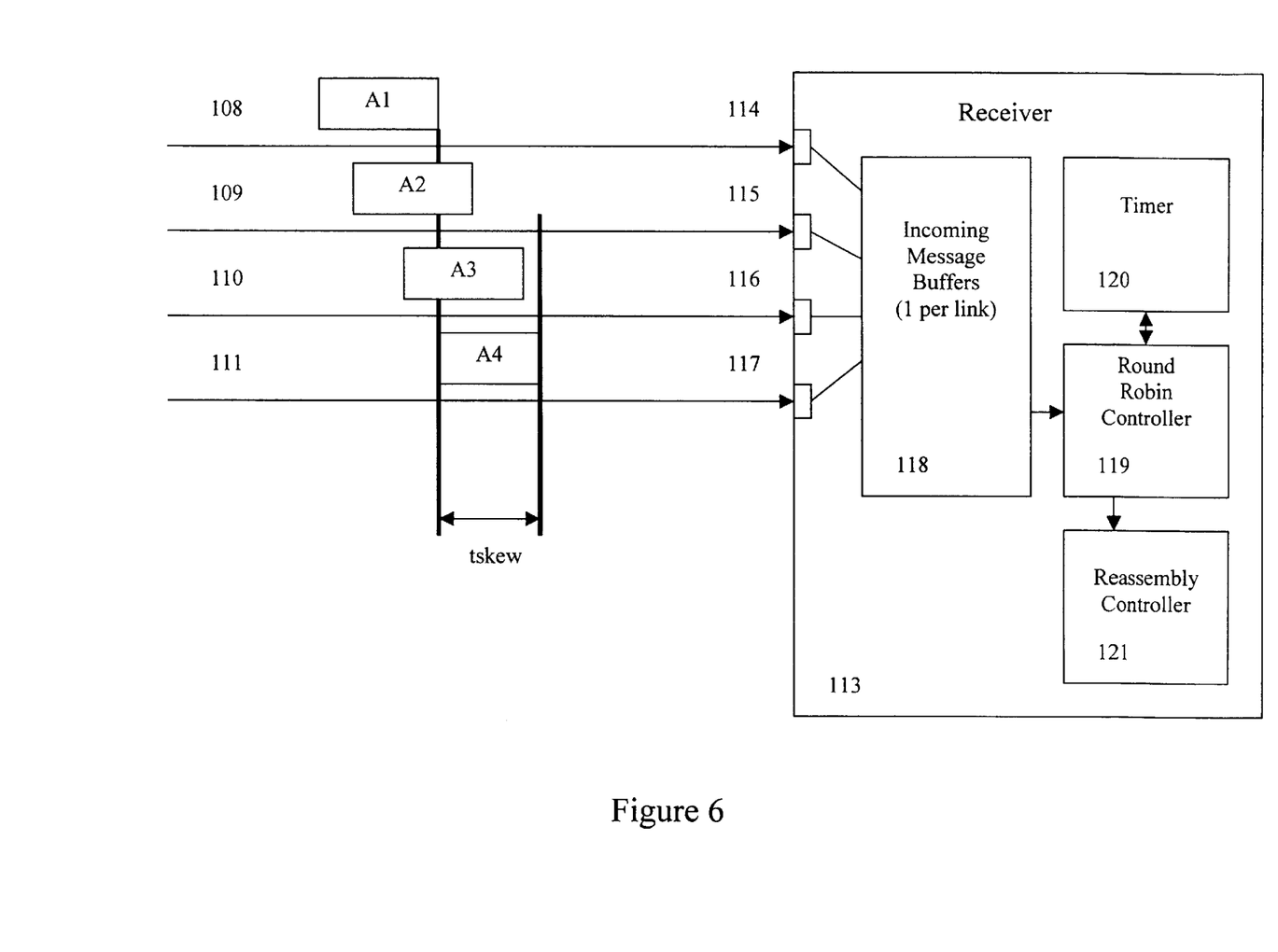
FIG. 6 is a block diagram of a reception in round-robin fashion over bundled links in which the reception has been skewed but remains valid according to one embodiment of the present invention.

Unexpected cell arrival can occur on any link, or any number of links. According, to embodiments of the present invention, if the arrival occurs before the expiration of the tskew timer for the expected link, the reception is still valid. FIG. 6 is a block diagram of a reception in round-robin fashion over bundled links in which the reception has been skewed but remains valid according to on embodiment of the present invention. Here, port 114 is at the top of the round-robin order. Cells A4, A3, and A2 all arrive before A1 but the reception is still valid because A1 arrived before the expiration of the tskew timer, 120. A tskew failure occurs when the expected receive port tskew window is exceeded. This failure can only occur in a link, which drops a cell. In one embodiment, under conditions of tskew failure, the receiver advances the expected link, round-robin order, to the next link, which has already received a cell.

Figure 7:
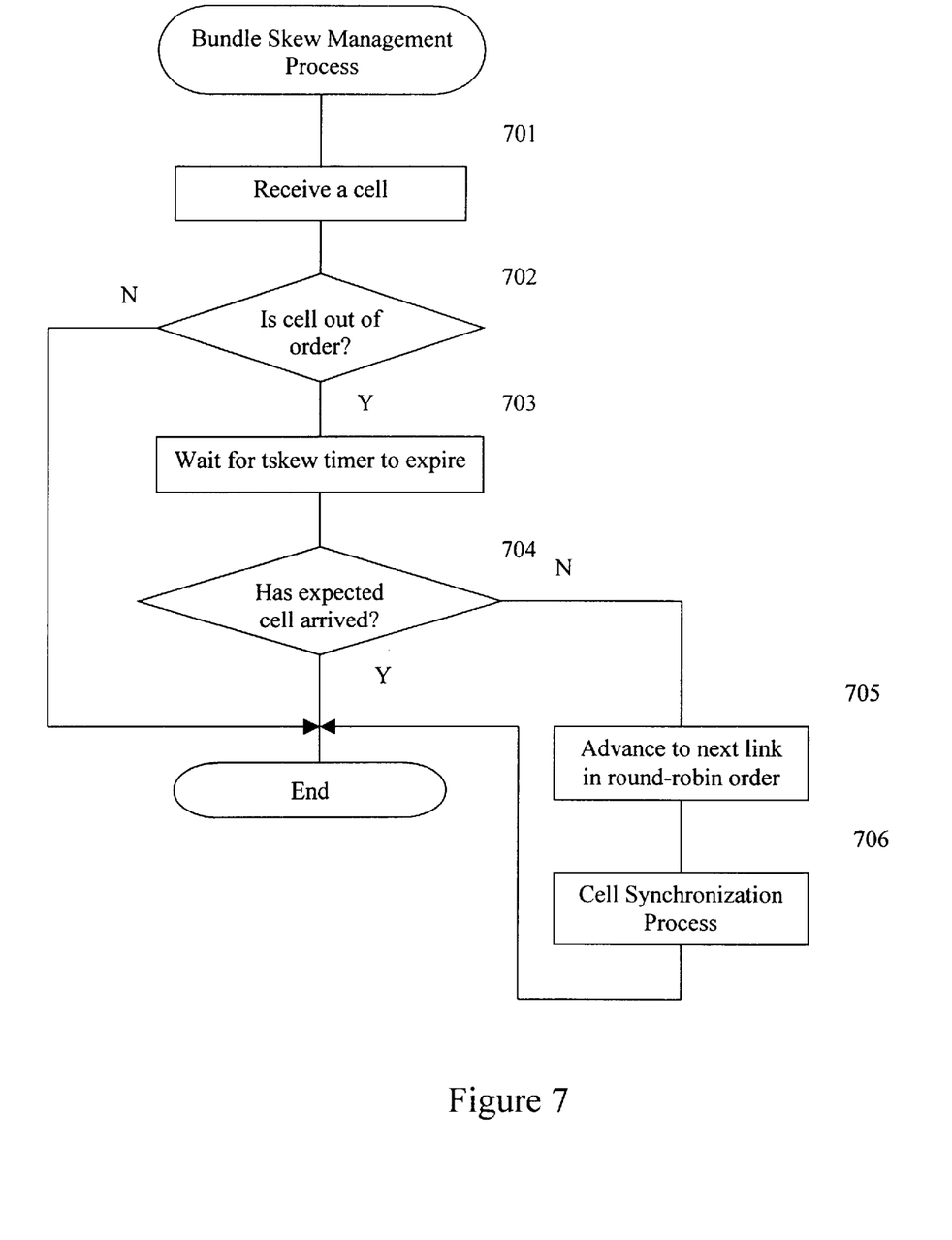
FIG. 7 is a flow diagram of bundle skew management according to one embodiment of the set invention.

This process, according to one embodiment of the present invention, is further described in FIG. 7. First, a cell is received 801. Next, a determination is made as to whether this cell is out of the proper order 802. This determination is based on whether the cell arrived on the next expected link of the round-robin order. If the cell is out of order, that is, arrived on a link other than the expected link, the receiver will wait for a period up to the value of the tskew timer for the expected link 803. If a cell has not yet arrived on the expected link 804, that link is removed from the round-robin order 805 and the cell synchronization process can be done.

Cell Synchronization Process

Figure 8:
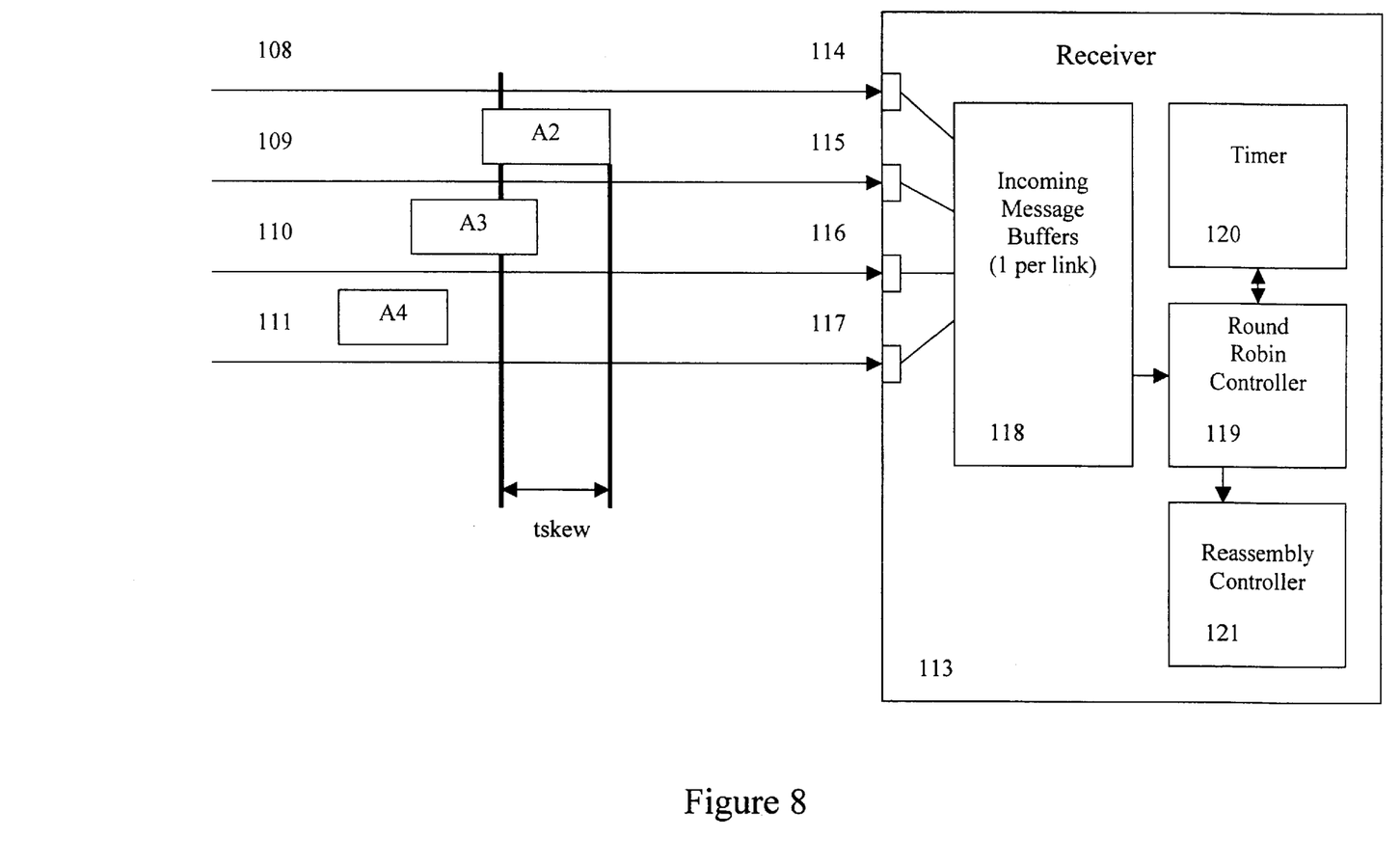
FIG. 8 is a block diagram of a reception in round-robin fashion over bundled links in which the reception has been excessively skewed resulting in a failure due to a dropped cell according to one embodiment of the present invention.

FIG. 8 is a block diagram of a reception in round-robin fashion over bundled links in which the reception has been excessively skewed resulting in a failure due to a dropped cell according to one embodiment of the present invention. Here, port 114 is currently at the top of the receiver round-robin order. The receiver expects a cell to arrive at port 114. When the cell (A2) arrives at port 115, the receiver continues waiting for a cell at port 115 for an additional tskew time window. When the expected cell on port 114 does not arrive, the receiver advances port 115 to the top of the round-robin order, overriding and resetting sequence number and round-robin expectations.

Figure 9:
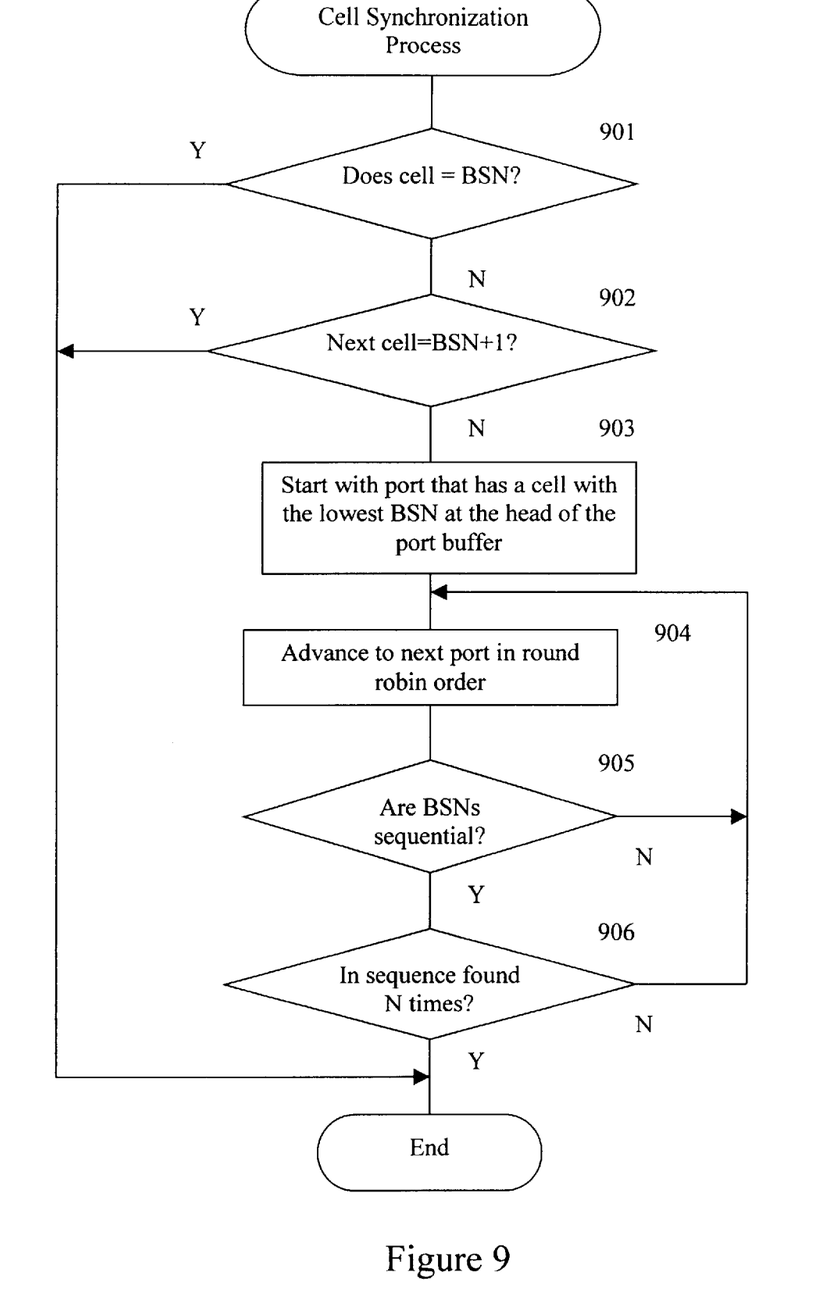
FIG. 9 is a flow diagram of cell synchronization according to one embodiment of the present invention.

In one embodiment of the current invention illustrated in FIG. 9, this process is entered when more than a simple cell skip is detected. Basically, detecting skipped cells means that the expected cell doesn't match the bundle sequence number (BSN) 901 and the next expected cell doesn't match BSN+1 902. Current cells in the other port's buffers should be emptied out in a best effort fashion. In this mode, the lowest BSN cell at the head of a port buffer is always processed first 903–904. When this technique establishes a linear sequence, N times in a row (N=number of links in bundle) 905–906 then both transmitter and receiver have re-established synchronization and can go into normal servicing mode. MLX does not specify how to determine the lowest BSN cell. MLX can be a fast parallel process, or a slow serial, scan process. The receiver is expected to use flow control to throttle the transmitter if this process takes a long time.

Transmitter Behavior on Failed Link of Bundle

Figure 10:
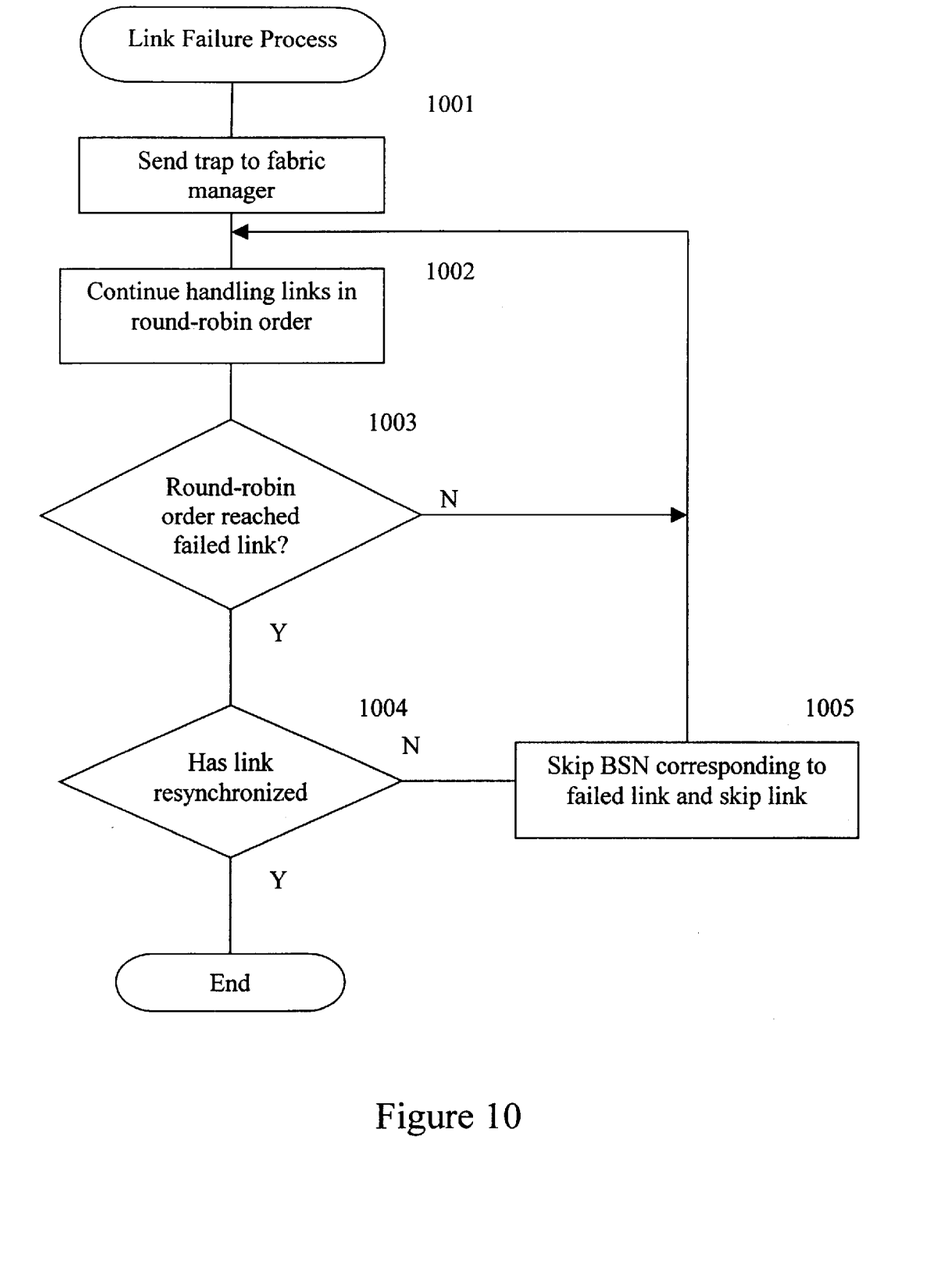
FIG. 10 is a flow diagram of link failure processing according to one embodiment of the present invention.

In one embodiment of the current invention illustrated in FIG. 10, when a transmitter detects that a link of the bundle has failed (link loses sync), the receiver sends a signal to a fabric manager 1001, which removes the failed link from the round robin order. The receiver then continues to handle the other links in the round-robin order 1002. If the round robin order reaches the failed link 1003 and the link has not resynchronized 1004 the receiver skips the BSN corresponding to the failed link and continues to exclude that link from the round-robin order 1005 until a cell is received on that link in the proper order. Until the receiver receives a new bundle configuration or the failed link resynchronizes by itself, the transmitter dispatches all cells, in order, over the remaining functional links.

This dispatch differs from normal operation in one aspect. When the transmitter passes the position in the round-robin order held by a failed link, the transmitter skips a BSN corresponding to the skipped position previously held by that link.

This behavior guarantees minimal data loss caused by a link failure, and poses minimal disruption to the receive cell synchronization process.

Flow Control

MLX does not affect link level flow control. If a cell arrives on an unexpected link of a bundle, depending on the offset of the links from expected to unexpected and the depth of its receive buffers, the receiver may choose to flow control the link until the port synchronization event is resolved.

Flow control on a link of a bundle may affect other links of the bundle. Assertion by the receiver of flow control on a link of the bundle will affect the transmitted flow behavior on other links of the bundle when the flow-restricted link is at the top of the round-robin order. As long as the previous conditions are met, all bundled links will behave according to the flow control of the most restrictive link.

In view of the many possible embodiments to which the principles of our invention may be applied, it will be appreciated that the embodiments and aspects thereof described herein with respect to the drawings/figures are only illustrative and should not be taken as limiting the scope of the invention. To the contrary, the invention as described herein contemplates all such embodiments as may come within the scope of the following claims and equivalents thereof.

What is claimed is:

1. A method, comprising:
   combining a plurality of links between a plurality of devices in a computer system or network into a single channel;
   receiving a plurality of cells using the plurality of links of the single channel in a round-robin order; and
   compensating for variations in flight time between the plurality of links through a timer at each receive port of a bundle by determining whether a cell of the plurality of cells was received on an unexpected link of the plurality of links and, if the cell was received on the unexpected link, waiting for the cell to arrive on an expected link for up to a value of a timer of the expected link.

2. The method of claim 1, wherein the value of the timer represents the worst-case flight time of the smallest possible cell of the plurality of cells across a particular physical link of the plurality of links.

3. The method of claim 1, further comprising advancing the expected link to the next link that has already received a cell when the previous expected link has not received a cell within the value of the timer.

4. The method of claim 3, further comprising correcting cell synchronization by:
   emptying port buffers in a best effort fashion; and
   processing the cell with the lowest bundle sequence number first.

5. The method of claim 4, further comprising determining synchronization of a link based on the occurrence of a linear sequence of bundle sequence numbers a number of times in a row.

6. The method of claim 5, wherein the number equals the number of links in the bundle.

7. The method of claim 3, further comprising:
   sending a signal to a fabric manager to remove failed links from the round-robin order; and
   dispatching the plurality of cells over the remaining links of the plurality of links until the failed link receives a new bundle configuration or resynchronizes.

8. The method of claim 7, further comprising skipping a bundle sequence number corresponding to the failed link when a transmitter passes the failed link in the round-robin order.

9. An apparatus, comprising:
   a plurality of devices having a central processing unit (CPU) and a peripheral device coupled with the CPU;
   a transmitter coupled with the CPU, the transmitter to transmit a plurality of links between the plurality of devices as a single channel; and
   a receiver coupled with the CPU, the receiver to receive a plurality of cells using the plurality of links of the single channel in a round-robin order, and compensating for variations in flight time between the plurality of links through a timer at each receive port of a bundle by determining whether a cell of the plurality of cells was received on an unexpected link of the plurality of links and, if the cell was received on the unexpected link, waiting for the cell to arrive on an expected link for up to a value of a timer of the expected link.

10. The apparatus of claim 9, wherein the value of the timer represents the worst-case flight time of the smallest possible cell of the plurality of cells across a particular physical link of the plurality of links.

11. The apparatus of claim 9, wherein the receiver is further to advance the expected link to the next link that has already received a cell when the previous expected link has not received a cell within the value of the timer.

12. The apparatus of claim 11, wherein the receiver is further to correct cell synchronization by:

emptying port buffers in a best effort fashion; and processing the cell with the lowest bundle sequence number first.

13. The apparatus of claim 12, wherein the receiver is further to determine synchronization of a link based on the occurrence of a linear sequence of bundle sequence numbers a number of times in a row.

14. The apparatus of claim 13, wherein the number equals the number of links in the bundle.

15. The apparatus of claim 11, wherein the receiver is further to:

sends a signal to a fabric manager to remove failed links from the round-robin order; and dispatch the plurality of cells over the remaining links of the plurality of links until the failed link receives a new bundle configuration or resynchronizes.

16. The apparatus of claim 15, wherein the receiver is further to skip a bundle sequence number corresponding to the failed link when the transmitter passes the failed link in the round-robin order.

17. A machine-readable medium having stored thereon data representing sets of instructions which, when executed by a machine, cause the machine to:

combine a plurality of links between a plurality of devices into a single channel;

receive a plurality of cells using the plurality of links of the single channel in a round-robin order; and compensate for variations in flight time between the plurality of links through a timer at each receive port of a bundle by determining whether a cell of the plurality of cells was received on an unexpected link of the plurality of links and, if the cell was received on the unexpected link, waiting for the cell to arrive on an expected link for up to a value of a timer of the expected link.

18. The machine-readable medium of claim 17, wherein the value of the timer represents the worst-case flight time of the smallest possible cell of the plurality of cells across a particular physical link of the plurality of links.

19. The machine-readable medium of claim 17, wherein the sets of instructions which, when executed by the machine, further cause the machine to advance the expected link the next link that has already received a cell when the previous expected link has not received a cell within the value of the timer.

20. The machine-readable medium of claim 19, wherein the sets of instructions which, when executed by the machine, further cause the machine to:

remove a failed link of the plurality of links from the round-robin order;

send a trap to a fabric manager; and dispatch the plurality of cells over the remaining links of the plurality of links until the failed link receives a new bundle configuration or resynchronizes.

21. The machine-readable medium of claim 20, wherein the sets of instructions which, when executed by the machine, further cause the machine to skip a bundle sequence number corresponding to the failed link when a transmitter passes the failed link in the round-robin order.

22. A system, comprising:

a storage medium;

a plurality of devices coupled with the storage medium, the plurality of devices having a central processing unit (CPU) and a peripheral device coupled with the CPU;

a transmitter coupled with the CPU, the transmitter to transmit a plurality of links between the plurality of devices as a single channel; and a receiver coupled with the CPU, the receiver to receive a plurality of cells using the plurality of links of the single channel in a round-robin order, and compensating for variations in flight time between the plurality of links through a timer at each receive port of a bundle by determining whether a cell of the plurality of cells was received on an unexpected link of the plurality of links and, if the cell was received on the unexpected link, waiting for the cell to arrive on an expected link for up to a value of a timer of the expected link.

23. The system of claim 22, wherein the value of the timer represents the worst-case flight time of the smallest possible cell of the plurality of cells across a particular physical link of the plurality of links.

24. The system of claim 22, wherein the receiver is further to advance the expected link to the next link that has already received a cell when the previous expected link has not received a cell within the value of the timer.

25. The system of claim 24, wherein the receiver is further to:

remove a failed link from the round-robin order;

send a trap to a fabric manager; and dispatch the plurality of cells over the remaining links of the plurality of links until the failed link receives a new bundle configuration or resynchronizes.

26. The system of claim 25, wherein the receiver is further to skip a bundle sequence number corresponding to the failed link when the transmitter passes the failed link in the round-robin order.

* * * * *

UNITED STATES PATENT AND TRADEMARK OFFICE
CERTIFICATE OF CORRECTION

PATENT NO. : 6,687,840 B1
DATED : February 3, 2004
INVENTOR(S) : Drottar et al.

It is certified that error appears in the above-identified patent and that said Letters Patent is hereby corrected as shown below:

<u>Column 2,</u>
Line 54, before "invention", delete "set", insert -- present --

Signed and Sealed this

Eighteenth Day of May, 2004

JON W. DUDAS
*Acting Director of the United States Patent and Trademark Office*